US011417042B2

(12) United States Patent
Rico

(10) Patent No.: US 11,417,042 B2
(45) Date of Patent: Aug. 16, 2022

(54) ANIMATING BODY LANGUAGE FOR AVATARS

(71) Applicant: Sony Interactive Entertainment Inc., Tokyo (JP)

(72) Inventor: Javier Fernandez Rico, Pacifica, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/691,478

(22) Filed: Nov. 21, 2019

(65) Prior Publication Data

US 2021/0158589 A1 May 27, 2021

(51) Int. Cl.
*G06T 13/40* (2011.01)
*G06T 13/20* (2011.01)
*A63F 13/67* (2014.01)
*G06N 20/00* (2019.01)

(52) U.S. Cl.
CPC ........... *G06T 13/40* (2013.01); *A63F 13/67* (2014.09); *G06N 20/00* (2019.01); *G06T 13/205* (2013.01); *A63F 2300/6607* (2013.01)

(58) Field of Classification Search
CPC .............................. G06T 13/40; G06T 13/205
USPC ........................................................ 345/473
See application file for complete search history.

(56) References Cited

U.S. PATENT DOCUMENTS

2008/0215971 A1\* 9/2008 Gillo ..................... A63F 13/005
715/706
2019/0172243 A1\* 6/2019 Mishra .................. G10L 15/063

\* cited by examiner

*Primary Examiner* — Thomas J Lett
(74) *Attorney, Agent, or Firm* — Penilla IP, APC

(57) ABSTRACT

Methods and systems are provided for generating animation for non-player characters (NPCs) in a game. The method includes operations for examining a scene for an NPC that is providing voice output. The method further includes operations for examining the voice output to identify am intensity modulation of the voice output. In addition, the method further includes processing the intensity modulation to predict body language signals (BLS) for the NPC. Moreover, the BLS is used to cause features of the NPC to react consistent with an emotion content of the intensity modulation identified in the voice output.

20 Claims, 13 Drawing Sheets

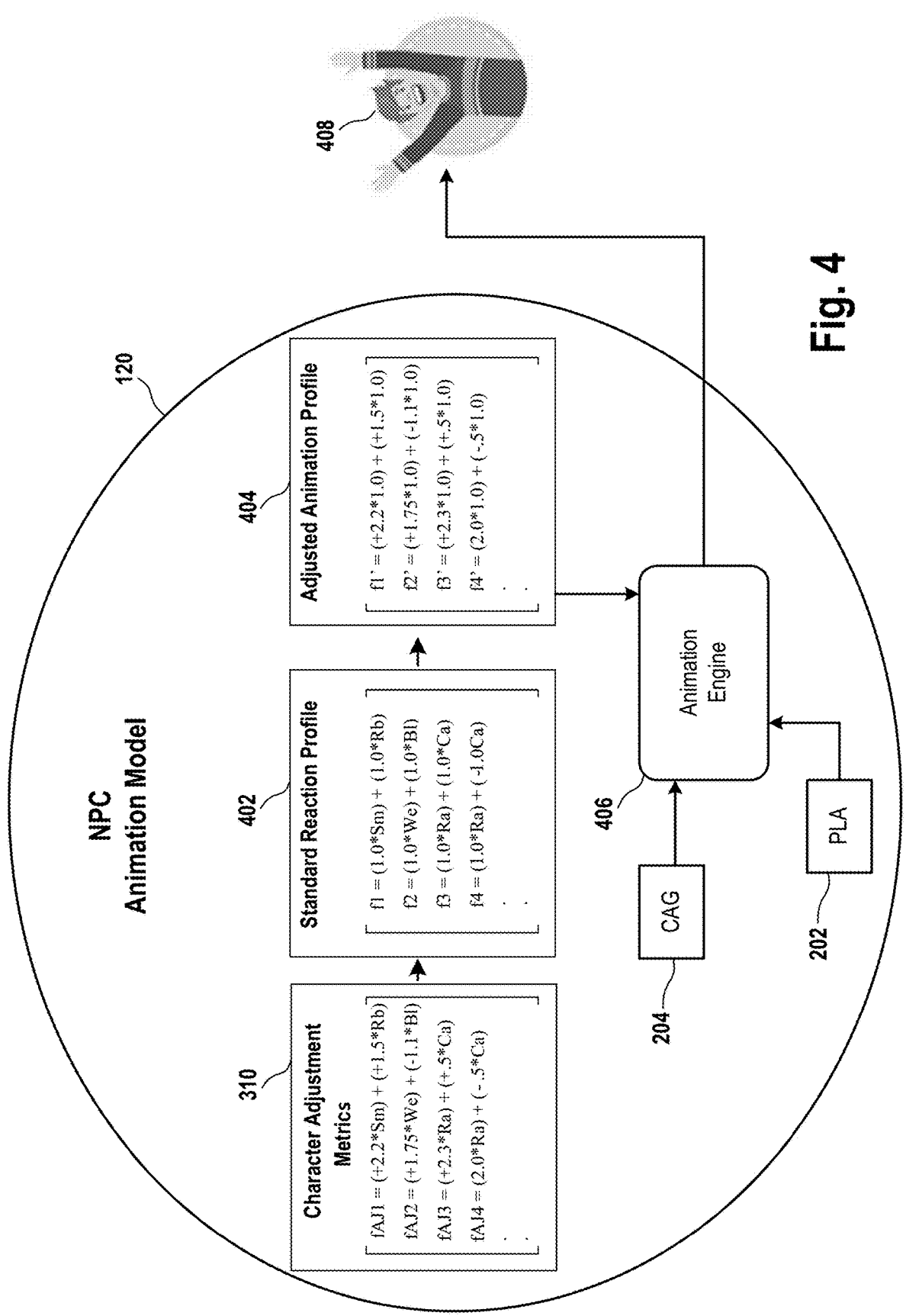

| Standard Reaction Profile Table | | |
|---|---|---|
| Body Parts & Accessories | Standard Reaction Profile | Reaction |
| Face | f1 = (1.0*Sm) + (1.0*Rb) | Frowning, glaring, smiling, raised brows, open mouth, etc. |
| Eyes | f2 = (1.0*We) + (1.0* Bl) | Blinking, squinting, widening the eyes |
| Left Arm | f3 = (1.0*Ra) + (1.0*Ca) | Raising arm, crossing arm, standing with hands placed on the hips, etc. |
| Right Arm | f4 = (1.0*Ra) + (1.0*Ca) | Raising arm, crossing arm, standing with hands placed on the hips, etc. |
| Left Hand | f5 = (1.0*Cf) + (1.0*P) | Clenched fist, pointing, thumbs up, thumbs down, etc. |
| Right Hand | f6 = (1.0*Cf) + (1.0*P) | Clenched fist, pointing, thumbs up, thumbs down, etc. |
| Torso | f7 = (1.0*To) + (1.0*Ho) | torso open and exposed, hiding torso by hunching forward or turning away, etc. |
| Left Leg | f8 = (1.0*Jb) + (1.0*Cl) | Jump back, Cross legs, etc. |
| Right Leg | f9 = (1.0*Jb) + (1.0*Cl) | Jump back, Cross legs, etc. |
| Cape | f10 = (1.0*Fl) + (1.0*Lo) | Flapping, lowered, etc. |
| Weapons: hammer, gun, sword, bat | f11 = (1.0*Ra) + (1.0*Lo) | Raised, lowered, etc. |
| Armor | F12 = (1.0*Ra) + (1.0*Lo) | Raised, lowered, etc. |

Fig. 5A

| Composite Animation | |
|---|---|
| • Surprise<br>• Anger<br>• Fear<br>• Disgust<br>• Happy<br>• Sad<br>• Shame | • Pride<br>• Excited<br>• Embarrassed<br>• Envy<br>• Nervous<br>• Love<br>• Trust |

Fig. 5B

Figure 6A
Figure 6B
Figure 6C
Figure 6D
Figure 6E
Figure 6F
Fig. 6

ANIMATING BODY LANGUAGE FOR AVATARS

BACKGROUND

1. Field of the Disclosure

The present disclosure relates to generating animation for non-player characters in video games using context data obtained from a scene.

2. Description of the Related Art

The video game industry has seen many changes over the years. Video game developers have been coding games that incorporate sophisticated operations and mathematics to produce very detailed and realistic gaming experiences so that game characters appear more human-like.

A growing trend in the computer gaming industry is to develop game characters that provide some unique interaction between a player, e.g., player's character, and non-player game characters. Unfortunately, these non-player game characters tend to have a flat robotic-like expression. For example, when a player interacts with a game character during game play, the game character may appear robotic-like when it speaks or reacts to actions in the game. As a result, the gaming experience between players and non-player characters may appear a bit too unrealistic or lacking of excitement.

It is in this context that implementations of the disclosure arise.

SUMMARY

Implementations of the present disclosure include devices, methods and systems relating to generating animation for non-player characters in video games using data obtained from a scene. Various embodiments will be described below for purposes of providing examples of the disclosed methods and systems.

In one embodiment, a method is disclosed for generating animation for non-player characters. The method includes operations for examining a scene for a non-player character (NPC) that is providing voice output. The method further includes operations for examining the voice output to identify intensity modulation of the voice output. In addition, the method further includes processing the intensity modulation to predict body language signals (BLS) for the NPC. In some embodiments, the BLS can be used to cause features of the NPC to react consistent with an emotion content of the intensity modulation identified in the voice output. In some embodiments, the predicted BLS can be derived using machine learning, which can be inputs regarding the current game context, the type of player and/or action occurring in the scene.

In another embodiment, a system for generating animation for a game is disclosed. The system includes a processor for executing the game. The game may include a scene for a non-player character (NPC) that is providing a voice output. According to some embodiments, the processor is configured to examine the voice output to identify intensity modulation of the voice output. Furthermore, the processor can be configured to process the intensity modulation to predict body language signals (BLS) for the NPC. Moreover, in some embodiments, the body language signals can be used to cause features of the NPC to react consistent with an emotion content of the intensity modulation identified in the voice output. In another embodiment, the reaction of the NPC can be displayed on a screen rendering the game, the reaction can include adjustments to the features of the NPC to substantially align with content of the voice output.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 4 illustrates an embodiment of an NPC animation model that can be used to animate an NPC, in accordance with an implementation of the disclosure.

FIG. 5A illustrates an embodiment of a standard reaction profile table for an NPC, in accordance with an implementation of the disclosure.

FIG. 5B illustrates an embodiment of a composite animation illustrating various emotion types, in accordance with an implementation of the disclosure.

FIGS. 6A-6F illustrate embodiments of NPCs prior to being animated and the corresponding animated NPCs after being animated, in accordance with an implementation of the disclosure.

DETAILED DESCRIPTION

Figure 1A:
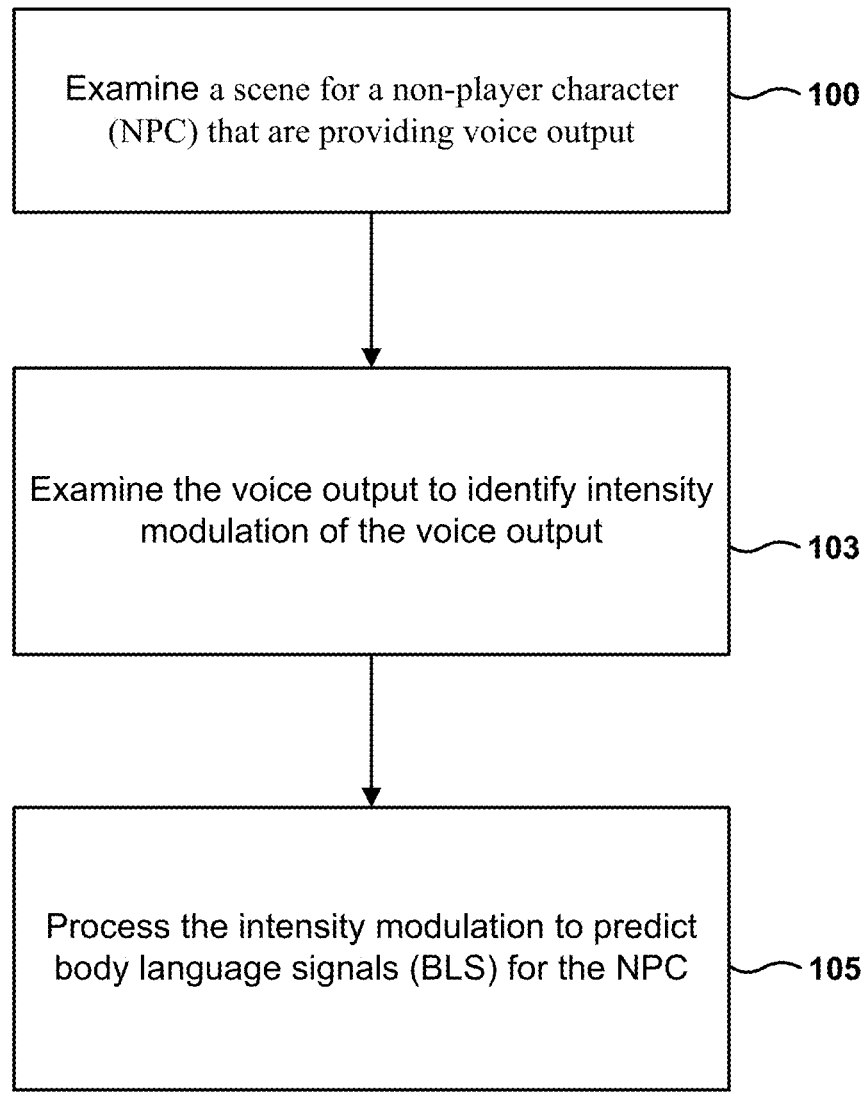
FIG. 1A illustrates an embodiment of a method for predicting body language for an NPC, in accordance with an implementation of the disclosure.

The following implementations of the present disclosure provide devices, methods, and systems for animating body languages of characters in a video game so that the body language for a given character is consistent with a corresponding voice output from the character. In one embodiment, a method is disclosed that enables animating body language of charterers in a video game. The method includes examining a scene for a non-player character (NPC) that is providing voice output. In addition, the method includes examining the voice output to identify an intensity modulation of the voice output. Further, the method includes processing the intensity modulation to predict body language signals (BLS) for the NPC. The predicted BLS can be used to animate the NPC so that the voice output from NPC is consistent with its body language. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for generating an animation for characters in video games so that their body language reacts consistently with the context of its corresponding voice output. In one embodiment, a system includes examining a scene from a game context. The game context may include a plurality of characters and corresponding voice outputs for the plurality of characters. In one embodiment, the characters may be a player that is controlled by a user, an avatar, or NPCs that appear throughout or in part of the game and associated context. The system may further include a voice output processing operation that can receive and process an output from the scene.

In one embodiment, the voice output processing operation can convert voice (e.g., spoken words by NPCs) to text (e.g., voice-text), receive NPC characteristics (e.g., what the NPC is, such as a human avatar, an animal avatar, a robot avatar, etc.), and context from the scene (e.g., what is occurring in the scene, the environment in the scene, the type of game and action occurring therein, etc.). For example, a player controlled by a user may encounter an NPC in a scene. The NPC may verbally communicate to the player, "I am scared, this area looks creepy." The voice output processing operation may process the voice output from the NPC, analyze the physical features and characteristics of the NPC, and analyze the context and surrounding environment of the NPC.

In accordance with another embodiment, the voice output processing can include an intensity modulation that analyzes the voice output from the NPC. A speech recognition operation can convert the voice output of the NPC from voice-to-text before being analyzed by the intensity modulation. In one embodiment, the intensity modulation may determine a sound intensity for the text of the voice output. In one embodiment, the sound intensity can be used as an input to an Artificial Intelligence (A.I.) module to help predict a corresponding BLS for a given NPC.

In another embodiment, the system further includes the A.I. module that is configured to receive an input from the voice output processing operation. The input can be the voice-text conversion of the voice output, the player characteristics of the NPC, and the context from the game. The A.I module may use a machine learning model that is used to predict a character adjustment metrics based on the input data (i.e., text, player characteristics, and context). The character adjustment metrics can include various predictions for a given NPC. The predictions, in one embodiment, may be used for animating various parts of the NPC, and such predictions can be associated with various motions, direction of motions, velocities, weighting factor, etc. for a given NPC.

In one embodiment, the character adjustment metrics can be used as an input for an NPC animation model. The NPC animation model can use the character adjustment metrics to make adjustments to a standard reaction profile for a particular NPC. Once the adjustments are made to the standard reaction profile for an NPC, an adjusted animation profile is created for the NPC. In one embodiment, the standard reaction may be, for example, no reaction or the same reaction for all types of spoken word by the NPC. In one embodiment, the adjusted animation profile can be used by an animation engine to animate the NPC.

For example, as noted above, an NPC may communicate to a player, "I am scared, this area looks creepy." While the NPC communicates this statement to the player, the animated engine can generate a corresponding adjusted animation for the NPC so that the NPC reacts consistently with the context of the statement (i.e., "I am scared, this area looks creepy"). In this example, the adjusted animation of the NPC may suggest that the NPC is nervous or scared. Accordingly, the animation may include an adjusted animation for the NPC that shows: lowered eyebrows, eyes tightened, head lowered, torso shielded, shoulders hunched, arms lowered and crossed, hands quivering, etc.

In accordance with another embodiment, the standard reaction profile for an NPC can include a list of body parts (e.g., face, eyes, arms, legs, hands, etc.) and/or any accessories (e.g., cape, armor, gun, sword, bat, etc.) associated with the particular NPC. For each body part and accessory, the standard reaction profile can include a list of common reactions. These common reactions include a range of reactions such as: smiling, frowning, widening of eyes, raising arms, clenching fist, cape flapping, etc. As noted above, in one embodiment, the standard reaction profile can be adjusted by using the character adjustment metrics to create the adjusted animation profile which is used to animate the NPC.

In accordance with another embodiment, player location awareness (PLA) can be implemented by the animation engine to additionally augment the animation of the NPC. The PLA can include factors such as eye contact made between the NPC and the player. Furthermore, the PLA can include a direction of the NPCs face relative to the player or the player's avatar. When an NPC looks in the direction of the player or the player's avatar eye contact occurs between the two, which can infer a non-verbal type of communication and various types of emotions.

These emotions can include, without limitation, e.g., fear, sadness, happiness, anger, etc. For example, a scene may include an NPC and a player hiking along a trail. The NPC may be walking in front of the player and encounter a villain character lurking ahead at a distance. The NPC may turn its body towards the player, and while making eye contact with the player's avatar and whisper, "quiet, danger ahead." In this example, the direction of the face, eye contact, and body position of the NPC can be factors associated with the PLA and consequently help augment the animation of the NPC. In this example, the combination of the PLA and the adjusted animation profile (e.g., using the BLS) may help animate the NPC by making it appear surprised, scared, nervous, worried, etc.

In accordance with another embodiment, context awareness gesturing (CAG) can be implemented by the animation engine to help augment the animation of the NPC. In one embodiment, the CAG can include a zone of influence (e.g., a specific portion within the scene), context of the action, and environment of the scene. In one embodiment, the zone of influence can be a localized area within the scene where the NPC and the player are interacting. The zone of influence may include the player, a single NPC, and any other objects (e.g., villain character, rocks falling, a horse approaching, etc.) within the point of view of the NPC. The context of the action may include the context related to what the NPC and the player are doing (e.g., hiking, swimming, hunting, playing football, etc.). Furthermore, the environment of the scene may include the location and the type of environment where the NPC and the player are interacting in.

For example, the CAG can differentiate between various environment types (e.g., church, playground, mountain, amusement park, baseball field, etc.) and take into consideration the activity that is being performed by the NPC(s) and the player. As noted in the example above, an NPC and a player may be hiking along a trail. The NPC may notice a villain character walking at a distance along the trail. The NPC may turn to the player and with its index finger extended and placed vertically in front of its lips whisper to the player "quiet, danger ahead." In this example, the CAG may factor in the context of the scene (e.g., villain character, whispering by the NPC) to help animate the NPC by making it appear to the player that a dangerous condition lies ahead.

In accordance with another embodiment, the scene from the game context can include multiple NPCs interacting with the player. In this embodiment, each NPC may have a corresponding point of view (POV) and a body language signal (BLS) that it sends to the player. Because multiple NPCs can interact with the player, the system can filter and prioritize the BLS for the NPCs to determine which NPC has priority to interact with the player. For example, a scene may include a total of three NPCs. A first NPC may be positioned at a distance furthest from the player and have a corresponding POV and a BLS that it can send to the player. As used herein, the BLS are signals that are processed in order to animate the NPC so that the NPC will appear contextually animated to the player (or player's avatar). Thus, "sending" BLS means that the NPC has had its animation adjusted. Within the POV of the first NPC, the POV includes only the player. A second NPC may be positioned the most proximate to the player and have a corresponding POV and BLS that it can send the player.

Within the POV of the second NPC, the POV may include a villain character or threatening activity that is harmful to the player. A third NPC may be positioned near the first NPC with a corresponding POV and BLS that it can send to the player. The POV of the third NPC may also include the same villain character that is within the POV of the second NPC. Since there are multiple NPCs with a corresponding BLS, a BLS priority filtering operation can calculate a BLS score for each NPC and prioritize which NPC has priority to send the player its corresponding BLS. In this example, the BLS priority filtering operation may determine that the second NPC has the highest BLS score because of its proximity to the player and the because of the threat that is within its POV.

In accordance with another embodiment, the system can determine a BLS score for each NPC and plot the BLS score on a graph. The plot can provide a visual representation to determine the respective scores for each NPC.

FIG. 1A shows an overall flow of an embodiment of a method for predicting body language for an NPC so that it reacts consistently with the context of its corresponding voice output. According to the shown embodiment, the method includes an operation 100 that examines a scene for an NPC that is providing voice output. The method then flows to operation 103 that examines the voice output to identify an intensity modulation of the voice output. Further, the method then flows to operation 105 to processes the intensity modulation to predict body language signals (BLS) for the NPC. At operation 100, the method examines the scene for NPCs that are providing voice output. The scene 102 can be from a video game that includes game context 104.

The game context 104 can include a scene and a plurality of characters such as NPCs 106, avatars, or players etc., that appear throughout or in part of the game and associated context. Each character can include an associated voice output 108 that corresponds to words that are spoken by the respective character. At operation 103, the method examines the voice output 108 for each character or NPC. In one embodiment, when examining the voice output 108, an intensity is identified to examine the characteristics of the corresponding voice output 108. At operation 103, the results of the intensity modulation for the voice output 108 can be used as an input to predict a BLS 118 for the respective NPC 106. In some embodiments, a database with predefined animations can be utilized to predict the BLS 118. For example, after the method determines the intensity modulation for the voice output 108, the method can proceed to use the results from the intensity modulation to predict a corresponding BLS 118 for the NPC 106.

Figure 1B:
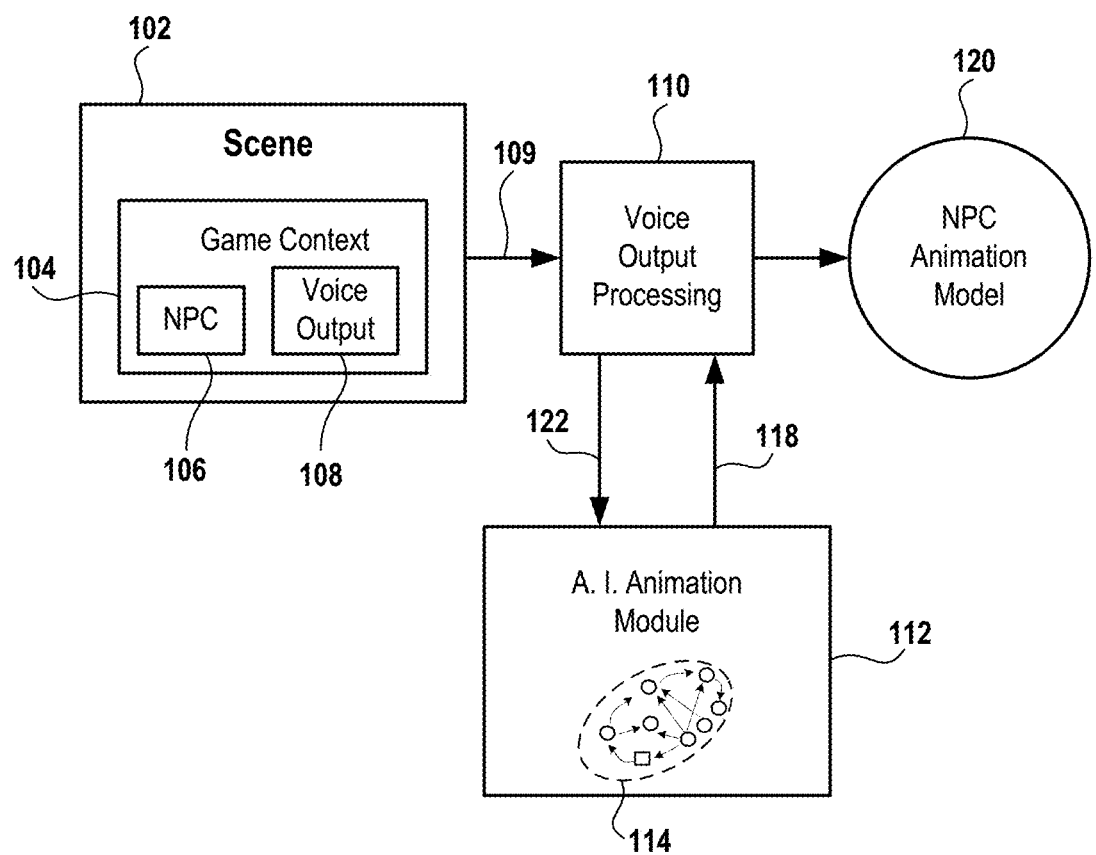
FIG. 1B illustrates an embodiment of a method for generating animation of an NPC using an Artificial Intelligence animation module, in accordance with an implementation of the disclosure.

FIG. 1B illustrates, in accordance with another embodiment, a method for generating animation of an NPC using an Artificial Intelligence animation module to determine a body language signal such that it is consistent with the context of its corresponding voice output, game context and NPC characteristics. In one embodiment, the method begins with examining the scene 102. The scene 102 can be a scene selected from video frame data or metadata associated with the game. In one embodiment, the scene 102 can be from a game context 104 obtained from a video game. The game context 104 can include a plurality of characters with a corresponding voice output 108 from each character. In one embodiment, the plurality of characters may include a player that is controlled by a user, an avatar, or NPCs 106 that appear throughout or in part of the game context 104. After the method examines the scene 102, a scene output 109 can be used as an input to a voice output processing operation 110 to process the voice output 108 of the NPCs 106.

In one embodiment, the voice processing operation 110 can convert the voice output 108 (e.g., spoken words by the NPC) to text, process NPC characteristics, and context from the scene 102. In another embodiment, conversion to text may be omitted and voice processing along may be used to extract the words and statements. Using these input characteristics, the voice processing operation 110 can examine the intensity modulation for each respective voice output 108. After the voice processing operation 110, the method then flows to A.I. animation module 112. An output 122 from the voice processing operation 110 can be used as an input for the A.I. animation module 112.

The A.I. animation module 112 may use a machine learning model 114 to predict a BLS 118 for an NPC 106. For example, an NPC 106 may communicate to a player, "you got this." In this example, the NPC 106 may be a football coach and the player is a quarterback. In addition, this interaction can occur during a football game with two minutes remaining on the clock. In this example, the A.I. animation module 112 can take into consideration the text (e.g., "you got this"), NPC player characteristics (e.g., football coach), and the context (e.g., football game tied with two minutes remaining). Taking into consideration these various inputs, the A.I. animation module 112 and the machine learning model 114 can predict a BLS 118 that would animate the NPC 106 (e.g., football coach) as expressing emotions of excitement and enthusiasm to instill confidence in the player.

Accordingly, the BLS 118 may include various motions such as eyes widened, facial expression smiling, torso open and learning towards the player, hands clapping, and arms embracing the player, etc. In one embodiment, the A.I. animation module 112 may process the above noted inputs to identify features associated with the context, the words spoken, the game context, etc., in order to classify the features. The classified features are then used by a machine learning engine to predict various parameters associated with the NPC's body language. These parameters, as described below, may include the way the NPC moves his arms, his head, his legs, his motions, his facial reactions, or combinations thereof.

In one embodiment, the prediction of the BLS includes processing feature data from the intensity modulation, the context data and the physical characteristics of the NPC. The processing of the feature data includes classifying the feature data through a machine learning model to produce character adjustment metrics that produce an adjusted animation profile. By way of example, machine learning model may be constructed over time using training data. The training data can be used to construct the model and enforce connections between nodes of the model. In some embodiments, the model is continuously updated in real-time, e.g., by use in one or more online games.

As such, it is possible for the model to improve over time, so that the output from the machine learning model, based on the inputs, produces more accurate adjustments in BLS. By way of example, as BLS data is improved, the character adjustments metrics can more accurately or realistically modify the standard reaction profile of an NPC. Thus, with more accurate adjustments in BLS, the adjusted animation profile will enable the animation engine to more realistically correlate the voice output of the NPC to its body language.

In one embodiment, after the A.I. animation module 112 predicts the BLS 118 for the NPC 106, the BLS 118 may flow back to the voice processing operation 110 in which the voice processing operation 110 determines a character adjustment metrics based on the BLS 118. The character adjustment metrics can be used as an input to a NPC animation model 120 which can animate the NPC 106. In one embodiment, the NPC animation model 120 character adjustment metrics may be used for animating various parts of the NPC 106, and such character adjustment metrics can be associated with various motions, direction of motions, velocities, weighting factor, etc. for a given NPC 106.

Figure 2:
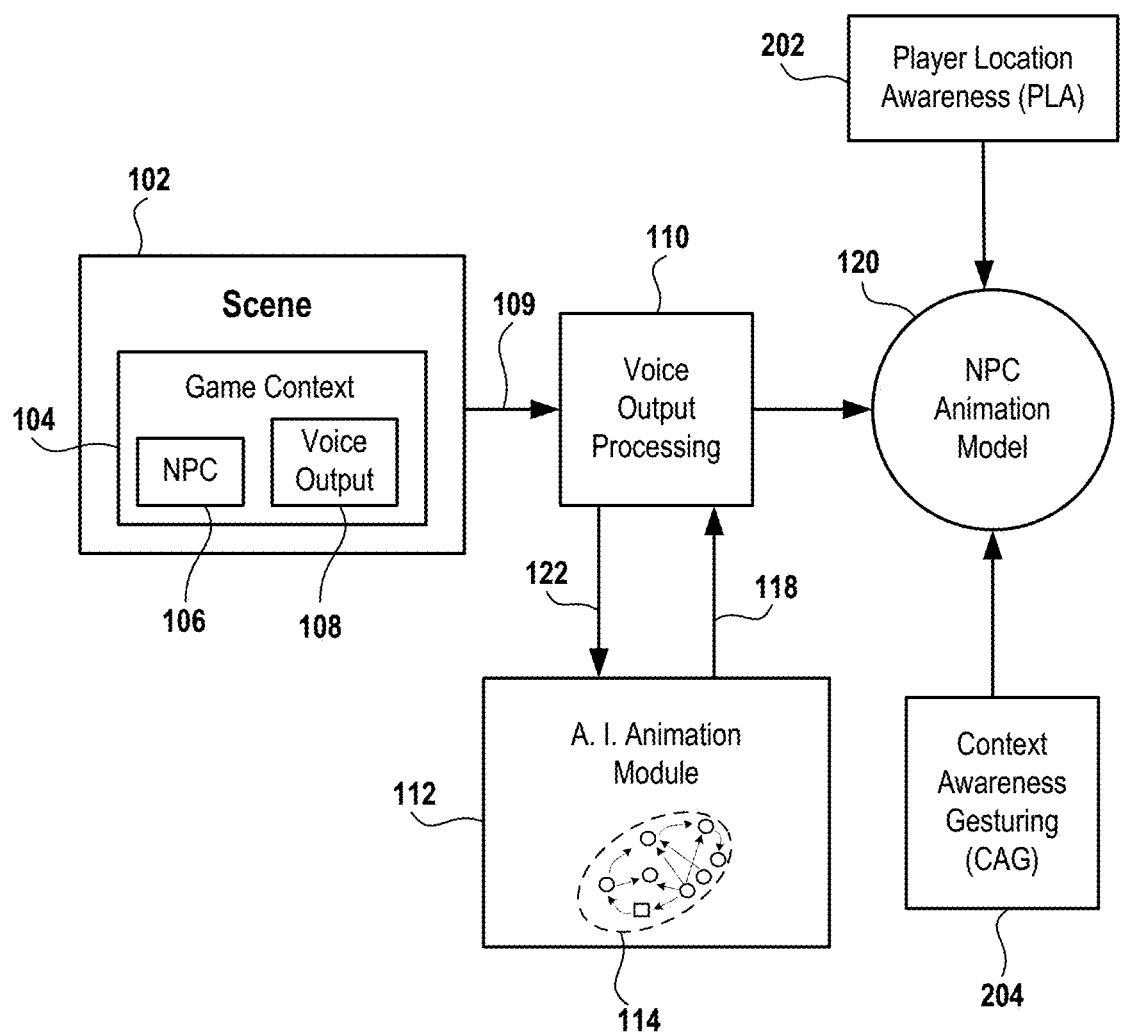
FIG. 2 illustrates an embodiment of a method for generating animation of an NPC using an Artificial Intelligence animation module, player location awareness (PLA), and context awareness gesturing (CAG), in accordance with an implementation of the disclosure.

FIG. 2 illustrates an embodiment of a method for generating animation of an NPC using an Artificial Intelligence animation module 112, and additionally, player location awareness (PLA), and context awareness gesturing (CAG). The PLA 202 and the CAG 204 can help the NPC animation model 202 by providing additional factors that improve the NPC 106 animation. Similar to the embodiment in FIG. 1B, the method begins with examining the scene 102 which may include the game context 104. The game context 104 can include a plurality of characters that appear throughout or in part of the game context 104. The plurality of characters may be a player that is controlled by a user, an avatar, or NPCs 106.

The method then flows to voice output processing operation 110 where the scene output 109 can be used as an input for the output processing operation 110. After the voice processing operation 110, the method then flows to the A.I. animation module 112 which may use the machine learning model 114 to predict the BLS 118 for a corresponding NPC 106. In one embodiment, the BLS 118 may flow back to the voice processing operation 110. Using the BLS 118, the voice processing operation 110 can determine an associated character adjustment metrics based on the BLS 118. The character adjustment metrics can be used as an input to the NPC animation model 120 which can animate the NPC 106.

In one embodiment, the NPC animation model 120 can also use PLA 202 as an input in addition to the character adjustment metrics to augment the animation of the NPC 106. The PLA 202 can include several factors such as: positioning of the NPCs 106 body (e.g., face, head, torso, feet, etc.) relative to the player, eye contact between the NPC 106 and the player, physical touch made between the NPC 106 and the player, etc. For example, when eye contact is made between the NPC 106 and the player, this suggests a non-verbal type of communication in which both parties are aware of each other's presence. Eye contact can also convey various types of emotions such as: fear, sadness, anger, happiness, excitement, etc.

As illustrated above, a scene 102 may include an NPC 106 and a player walking along a trail towards a desired destination. The NPC 106 may be in a leader position guiding the player to a safety along. While walking along the trail, the NPC 106 may encounter a villain character at a distance patrolling the trail. The NPC 106 may turn its body towards the player, and gently tap on the shoulder of the player. By making eye contact with the player and gently touching the player, the NPC 106 may suggest a sense of fear and danger. In this example, the position of the NPCs 106 body, the eye contact, and the touching of the player may be factors that contribute to the PLA 202 which help augment the animation of the NPC 106.

In another embodiment, the NPC animation model 120 can, additionally or alternatively, receive a CAG 204 as an input augment the animation of the NPC 106. As noted above, the CAG 204 can include a zone of influence, context of the action, and environment of the scene. With reference to the example above related to the NPCs sighting of the villain character, the CAG 204 can determine that a dangerous condition lies ahead. Accordingly, the CAG 204 would help animate the NPC 106 by animating as appearing scared, frightened, worried, etc.

Figure 3:
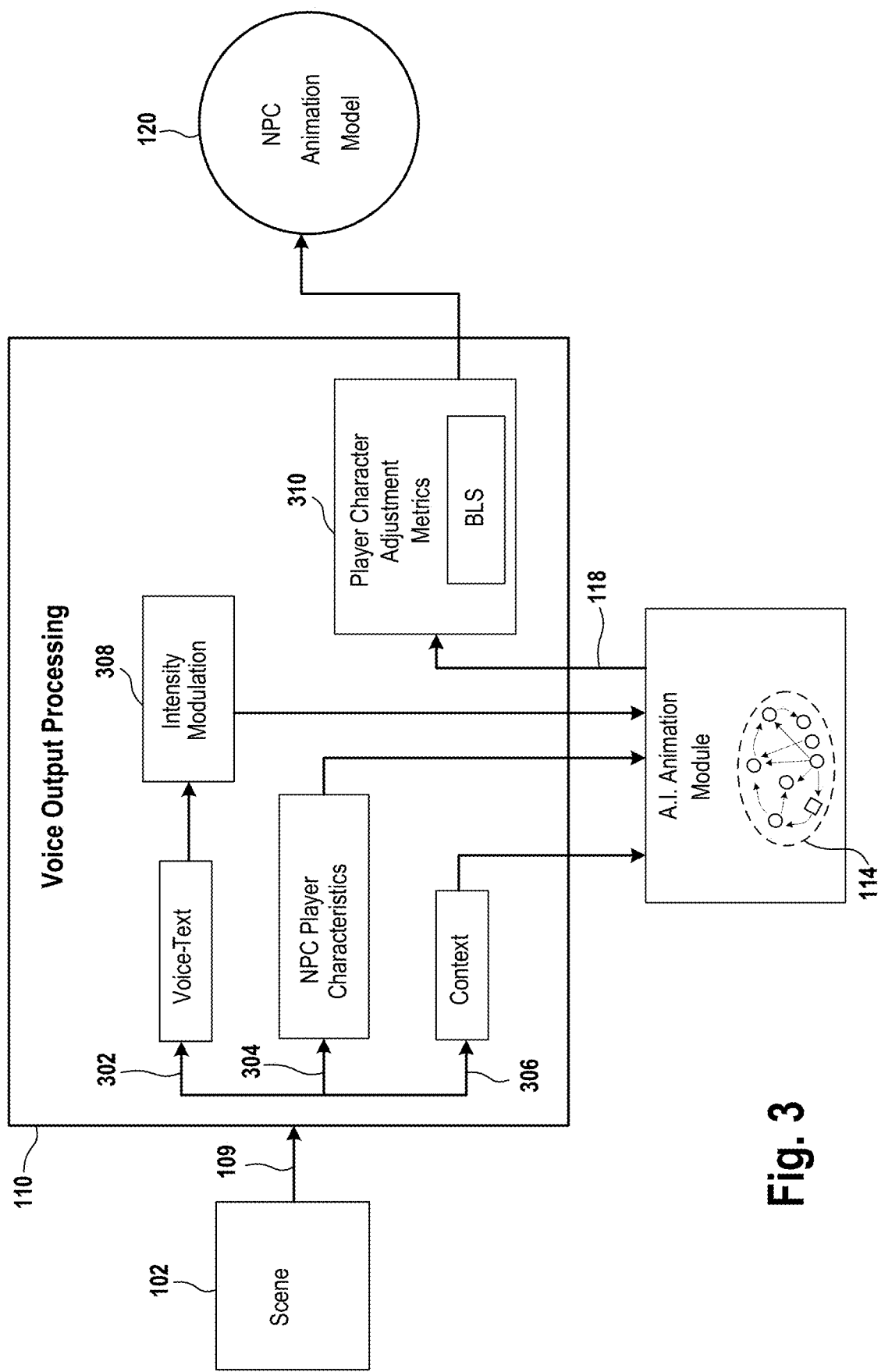
FIG. 3 illustrates an embodiment of a voice output processing operation, in accordance with an implementation of the disclosure.

FIG. 3 illustrates an embodiment of the voice output processing 110 operation. In the illustrated implementation, the method begins at the scene 102 which outputs scene output 109. The scene output 109 can be used as an input for the voice output processing 110 operation. In one embodiment, the scene output 109 may include voice output 108, NPC player characteristics 304, and context 306. The scene 102 output may also include metadata, state date and user data, associated with the context of the scene. Using the voice output 108, the voice output processing 110 operation can process the voice output 108 from the NPC 106 and convert voice (e.g., spoken words by NPCs) to text which results in voice-text 302. As noted above, the conversion from voice to text may be optional, and in some embodiments, the voice data need not be converted in order for processing.

The NPC player characteristics 304 are the features (e.g., gender, physical characteristics, body parts, clothing, weapons, accessories, etc.) defining the particular NPC 106 from the scene 102. For example, NPCs 106 can range from human avatars, animal avatars, to robot avatars, etc. The context 306 can include an array of data related to the scene 102. For example, this may include what is occurring in the scene, the environment in the scene, the type of game and action occurring therein, etc.

FIG. 3 further illustrates an embodiment of an intensity modulation 308 which can use the voice-text 302 as an input or simply voice data. In one embodiment, the intensity modulation 308 can analyze and measure or assign a sound intensity level for the voice-text 302. In another embodiment, the A.I. animation module 112 can be configured to receive various inputs from the voice output processing 110 operation. These inputs include NPC player characteristics 304, context 306, and the sound intensity measurements from the intensity modulation 308. Using these various inputs, the machine learning model 114 can be used to predict the BLS 118 for the NPC 106. Accordingly, the output of the A.I. animation module 112 can be the BLS 118 which is used to determine an associated character adjustment metrics 310. The associated character adjustment metrics 310 can be used as input for the NPC animation model 120 to animate the NPC 106.

FIG. 4 illustrates an embodiment of the NPC animation model 120 which can be used to animate the NPC 106. In the illustrated implementation, the operation begins with the character adjustment metrics 310. As noted above, the character adjustment metrics 310 can be derived from the BLS 118 which was predicted by the machine learning model 114. The character adjustment metrics 310 can include various predicted adjustments for a given NPC 106. The predicted adjustments, in one embodiment, may be used for adjusting animations of various parts (e.g., body parts and accessories associated with an NPC), facial features, etc., of the NPC 106, and such predicted adjustments can be associated with various motions, direction of motions, velocities, weighting factor, etc. for each part of a given NPC 106.

In one embodiment, the character adjustment metrics 310 can include a list of various metrics that correspond to the BLS predictions. The character adjustment metrics 310 can be used to adjust a standard reaction profile 402 to create an adjusted animation profile 404 for a given NPC 106. For example, the character adjustment metrics 310 can include the following metrics:

$$f_{AJ1}=(+2.2*Sm)+(+1.5*Rb)$$

$$f_{AJ2}=(+1.75*We)+(-1.1*Bl)$$

$$f_{AJ3}=(+2.3*Ra)+(+0.5*Ca)$$

$$f_{AJ4}=(2.0*Ra)+(-0.5*Ca)$$

In this example, $f_{AJ1}$, $f_{AJ2}$, $f_{AJ3}$, and $f_{AJ4}$ cam correspond to face, eyes, left arm, and right hand, respectively. Since $f_{AJ1}$ corresponds to the face of an NPC 106, the formula, $f_{AJ1}=(2.2*Sm)+(1.5*Rb)$ can be used to adjust the standard reaction profile 402 to determine the adjusted animation profile 404 for the face of the NPC 106. For example, "Sm" may refer to a "smile" and "Rb" may refer to "raised brows" which can be some example features of the face of the NPC 106. Furthermore, the values "+2.2" and "+1.5" may be associated with a weighting factor or weighting adjustment of the "smile" and "raised brows."

Accordingly, the standard reaction profile 402 for a face may be defined by $f1=(1.0*Sm)+(1.0*Rb)$, where Sm=1 and Rb=1 which can be default values for the standard reaction profile. Using the character adjustment metrics 310 to adjust the standard reaction profile 402, the adjusted animation profile 404 for the face can result in $f1'=(+2.2*1)+(+1.5*1)$. Accordingly, the adjusted animation profile 404, $f1'=(+2.2*1)+(+1.5*1)$, can be used as an input for animation engine 406 to determine the animation for the NPC 106. Consequently, in this example, a resulting animated NPC 408 may have a facial expression that smiles by a weighting factor of +2.2 with eyebrows raised by a weighting factor of +1.5. In accordance with another embodiment, the weighting factor may be used to increase, decrease, or any other combination thereof, the features of the standard reaction profile 402.

In addition, for the $f_{AJ2}$ (e.g., eyes) formula, "We" may refer to "widening eyes" and "Bl" may refer to "blinking." Furthermore, for the formula, $f_{AJ3}$ (e.g., left arm), "Ra" may refer to "raising arm" and "Ca" may refer to "crossing arm." Similarly, for the formula, $f_{AJ4}$ (e.g., right arm), "Ra" may refer to "raising arm" and "Ca" may refer to "crossing arm." It should be understood that the examples provided herein may not encompass all of the features associated with the many types of NPCs. For instance, some NPC physical characteristics may have more or less features, different skeletal definitions (e.g., torso, arms, legs, bone joints, head, neck and skeletal connections), different animation profiles, different physics, and graphics. The example formulas, therefore, are provided to illustrate how different features may be adjusted in response to the A.I. engine analysis and predictions.

FIG. 4 further illustrates an embodiment of the animation engine 406 which can be used to generate the animated NPC 408. As noted above, the adjusted animation profile 404 can be used as an input to the animation engine 406. Using the input, the animation engine 406 examines the features in the adjusted animation profile 404 and generates a corresponding animation which can result in the animated NPC 408. For example, as illustrated in FIG. 4, the animated NPC 408 is shown with its hands raised in the air and a smile on its face. In this example, the associated BLS 118, once processed, was used to make adjustments to the NPC 408 to convey an emotion of being happy or excited.

In accordance with another embodiment, the animation engine 406 may receive the PLA 202 and CAG 204 as inputs to augment the animation for the animated NPC 408. As noted above, the PLA 202 can include several factors such as: positioning of the NPCs 106 body (e.g., face, head, torso, feet, etc.) relative to the player, eye contact between the NPC 106 and the player, physical touch made between the NPC 106 and the player, etc. Furthermore, the CAG 204 can include factors such as the context of the interaction and the environment that the interaction is taking place. In accordance with another embodiment, the animation engine 406 may take into consideration the laws of physics (e.g., processed by a physics engine) when generating the animation for the animated NPC 408. For example, to make an animation for an NPC 106 appear more realistic, the animation engine 406 would take into consideration the physical characteristics of an NPC 106. For an NPC 106 that has tall stature and a heavyset build, when performing body movements such as jumping up in the air, the animation engine 406 would take into consideration the physical constraints and would limit distance of its vertical jump to make the NPC 106 appear more realistic.

FIG. 5A illustrates an embodiment of a standard reaction profile table 500 for a given NPC 106. In one embodiment, the standard reaction profile table 500 can include a list of body parts and accessories 502, the standard reaction profile 402, and a listing of reactions 504 associated with the corresponding body part and/or accessory. As illustrated, the body parts and accessories 502 can include, without limitation the face, eyes, arms, hands, torso, etc. In addition, the list may include any accessories associated with a given NPC 106. These accessories may include, by way of example, a cape, a hammer, a gun, a sword, armor, etc.

For each body part and/or accessory 502, there is a corresponding standard reaction profile 402 that is defined by a formula that describes the standard reaction for the particular body part. In addition, each body part and/or accessory 502 includes reactions 504. The reactions 504 include common reactions such as, by way of example, smiling, frowning, widening of eyes, raising arms, clenching fist, cape flapping, etc. For example, as shown in the standard reaction profile table 500, left leg has a standard reaction profile 402 that is defined by the formula, f8= (1.0*Jb)+(1.0*Cl), where Jb=1 and Cl=1 for the standard reaction profile. In this formula, "Jb" may refer to "jump back" and "Cl" may refer to "cross legs." These reactions are illustrated in the associated reactions 504 column in the standard reaction profile table 500.

FIG. 5B illustrates an embodiment of a composite animation 506 illustrating various emotion types that can be displayed by the animated NPC 408. In the illustrated implementation, the composite animation 506 table reveals various emotions that can be displayed by the animated NPC 408 after being processed by the animation engine 406. In one embodiment, the character adjustment metrics 310 (e.g., BLS 118), PLA 202, CAG 204, or any other combination thereof, can be used to create the emotions in the composite animation 506 table. For example, the animation engine 406 can receive as inputs the character adjustment metrics 310 and the PLA 202 and generate an animated NPC 408 expressing an "excited" emotion. In another embodiment, the animation engine 406 can receive as inputs the character adjustment metrics 310 and the CAG 204 to generate an expression indicating an emotion of "sadness."

FIGS. 6A-6F illustrate various embodiments of the NPCs 106 prior to being animated and the corresponding animated NPCs 408 after being animated. In one embodiment, as shown in FIGS. 6A and 6B, the figures illustrate the NPCs at a pre-animation stage and a post-animation stage. FIG. 6A illustrates the NPC 106 as having a neutral expression. After the generating the animation for the NPC 106, the resulting animated NPC 408a is shown in FIG. 6B. In this example, the NPC 408a is shown expressing an emotion conveying confidence. In this embodiment, the NPC 408a is shown wearing a cape and displaying a confident facial expression (e.g., lips tight, eyebrows raised) and body language (e.g., torso exposed, right hand hinged on hip, left arm raised in the air).

In another embodiment, FIGS. 6C and 6D illustrate the NPCs at a pre-animation stage and a post-animation stage. FIG. 6C illustrates the NPC 106 as having a neutral expression. FIG. 6D illustrates the resulting animated NPC 408b after being animated. In this embodiment, the animated NPC 408b is shown expressing an emotion indicating fear (e.g., eyebrows pulled up and together, upper eyelids pulled up, mouth stretched, arms raised and hands touching face).

In another embodiment, FIGS. 6E and 6F illustrate the NPCs at a pre-animation stage and a post-animation stage. FIG. 6E illustrates the NPC 106 having a neutral expression. FIG. 6F illustrates the resulting animated NPC 408b after being animated. In this embodiment, the animated NPC 408c is shown expressing an emotion indicating anger (e.g., eyebrows pulled down, upper eyelids pulled up, margins of lips rolled in, arms and hands raised in the air).

In another embodiment, the NPCs 106 and the corresponding animated NPCs 408 may be displayed on a screen rendering the game. The animated NPCs 408 may include adjustments to features of the NPC 106 to substantially align with content of the voice output 108 of the corresponding NPC 106.

Figure 7:
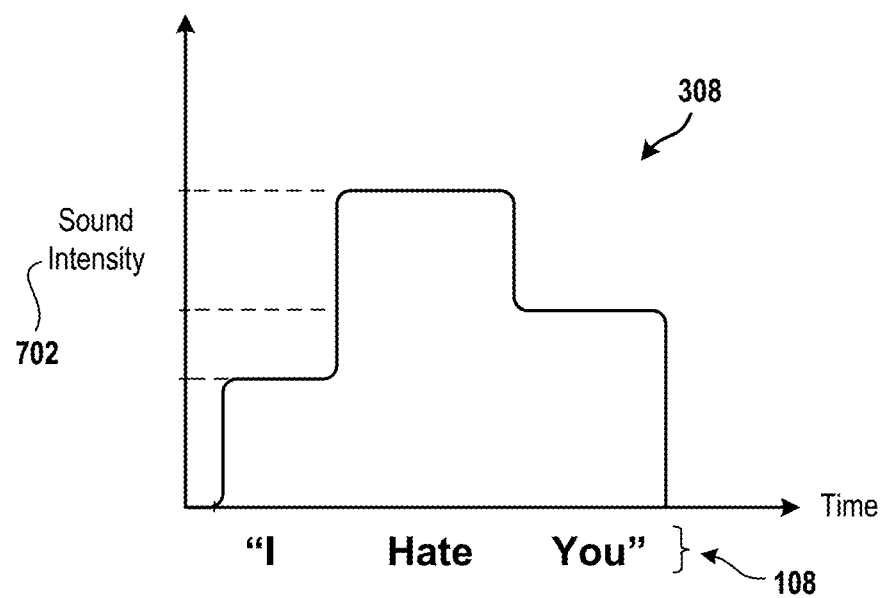
FIG. 7 illustrates an embodiment of a sound intensity graph, in accordance with an implementation of the disclosure.

FIG. 7 illustrates a sound intensity graph of an output from the intensity modulation 308. In one embodiment, the intensity modulation 308 may determine a sound intensity 702 for the text of the voice output 108. In some embodiments, conversion of voice to text is optional, and the voice output can be processed without conversion. As shown in the illustration, the voice output 108 "I hate you" is plotted on the sound intensity graph. The text "hate" has the highest magnitude while the text "I" has the lowest magnitude. In one embodiment, the sound intensity for a given text can be based on its context and meaning. This output, as shown in FIG. 3 above, is used as one input to the A.I. animation module, for identifying features and classification used to predict the appropriate adjustments to the various body parts by way of the output animation.

Figure 8:
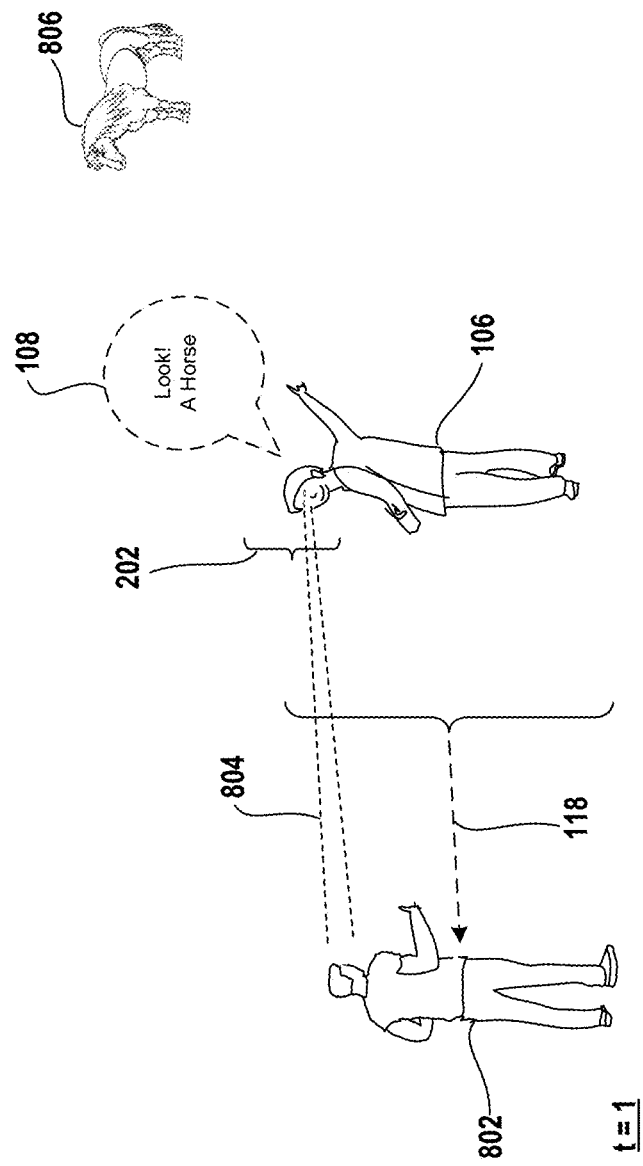
FIG. 8 illustrates an embodiment of a scene that includes an interaction between an NPC and a player, in accordance with an implementation of the disclosure.

FIG. 8 illustrates an embodiment of a scene 102 that includes an interaction between an NPC 106 and a player 802. In the scene 102, the NPC 106 and the player 802 are shown walking along a trail. The NPC 106 leads the excursion and walks in front of the player 802. At a distance along the trail, the NPC 106 sees a horse 806. The NPC 106 turns his body in the direction of the player 802 and while making eye contact with the player 802 points in the direction of the horse 806 and says "Look! A Horse." In this example, the voice output 108 is the statement (e.g., "Look! A Horse") that the NPC 106 makes to the player 802.

In addition, the PLA 202 includes the eye contact 804 that the NPC 106 makes to the player 802, and the direction of the NPCs 10 face relative to the player 802. In this example, the eye contact 804 and the direction of the NPCs 10 face may help augment the animation for the NPC 106. Within the scene 102, the CAG 204 factors in the context of the interaction and environment to help augment the animation for the NPC 106. For example, the CAG 204 may consider that the horse 806 appears spontaneously along the trail. Taking into consideration the voice output 108, the PLA 202, and the CAG 204, an animation (e.g., BLS 118) for the NPC 10 such the player 802 may perceive that the NPC 106 is expressing an emotion of excitement (e.g., eyes wide open, smiling, arm pointed in the direction of the horse).

Figure 9:
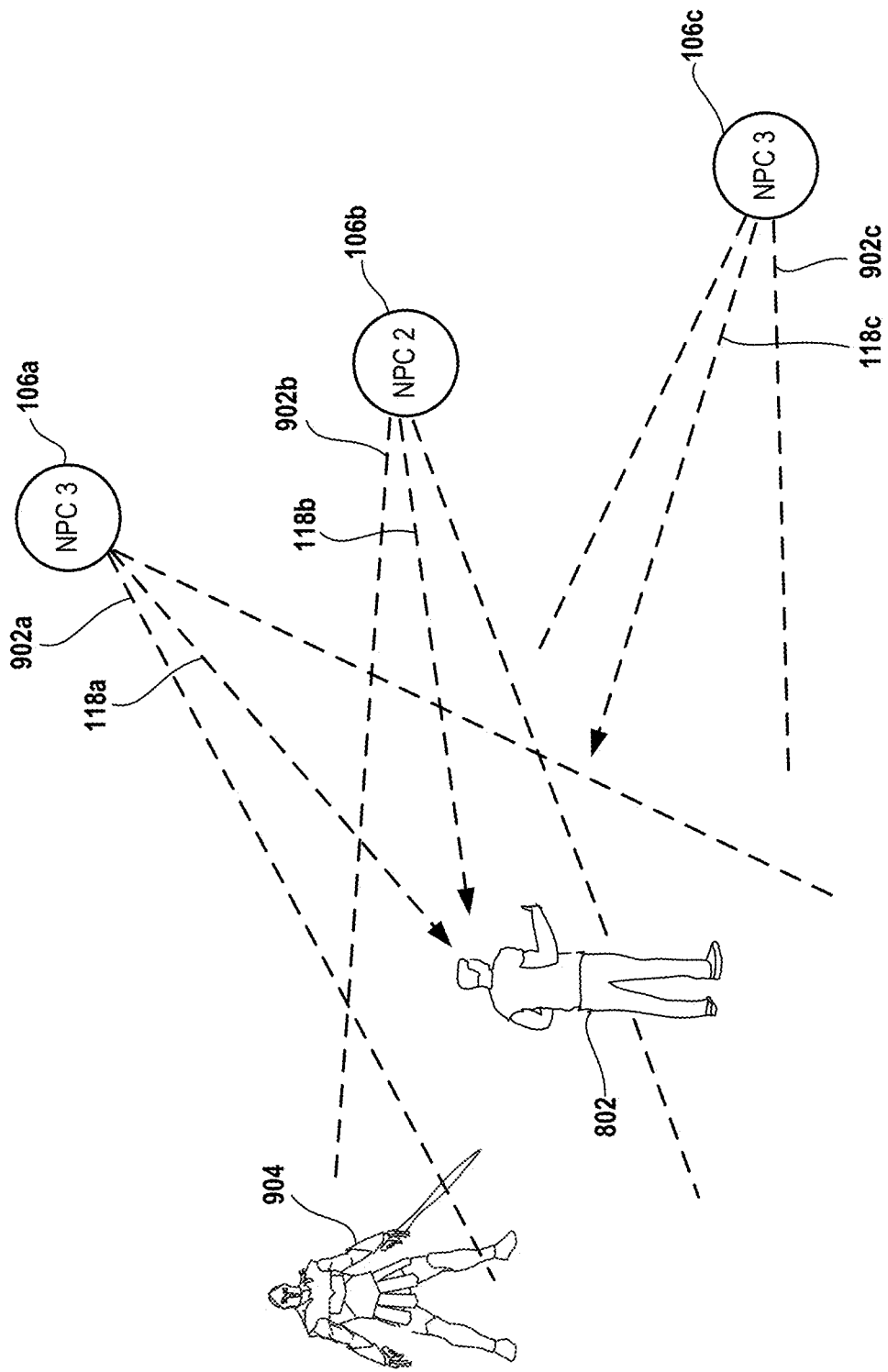
FIG. 9 illustrates an embodiment of a scene that includes multiple NPCs interacting with a player, in accordance with an implementation of the disclosure.

FIG. 9 illustrates an embodiment of a scene 102 that includes multiple NPCs 106 interacting with the player 802. In one embodiment, the scene 102 includes a first NPC 106a, second NPC 106b, and a third NPC 106c. Each NPC may have a corresponding point of view (POV) and adjusted animation that it sends to the player 802. For example, the first NPC 106a can include a POV 902a and adjusted animation (i.e., based on a BLS 118a) that it can send to the player 802. The second NPC 106b can include a POV 902b and adjusted animation (i.e., based on a BLS 118b) that it can send to the player 802. The third NPC 106c include a POV 902c and adjusted animation (i.e., based on a BLS 118c) that it can send to the player 802. Since there are multiple NPCs with different POVs, each NPC may have its own adjusted animation that it can send to the player 802.

In one embodiment, as shown in FIG. 9, the first NPC 106a may be positioned at a distance from the player 802 having corresponding POV 902a and adjusted animation that it can send to the player 802. Within the POV 902a of the first NPC 106a, the POV 902a may include only the player 802. The second NPC 106b may be positioned the most proximate to the player 802 with a corresponding POV 902b and adjusted animation that it can send the player 802. However, within the POV 902b of the second NPC 10b, the POV may include a villain character 904 or threatening activity that is harmful to the player 802. The third NPC 106c may be positioned at a distance furthest away from the player 802. The third NPC 106c may also have a corresponding POV 902c and adjusted animation that it can send the player 802. Within the POV 902c of the third NPC 106c, the villain character 904 may also appear within its POV. Since each NPC can have a unique perspective within its corresponding POV, an embodiment may include a priority and filtering operation that ranks the adjusted animation to apply or not apply for each NPC 106. By ranking and filtering, it is possible to reduce processing power associated with generating adjusted animation for NPCs that are not relevant or seen by the player.

Figure 10A:
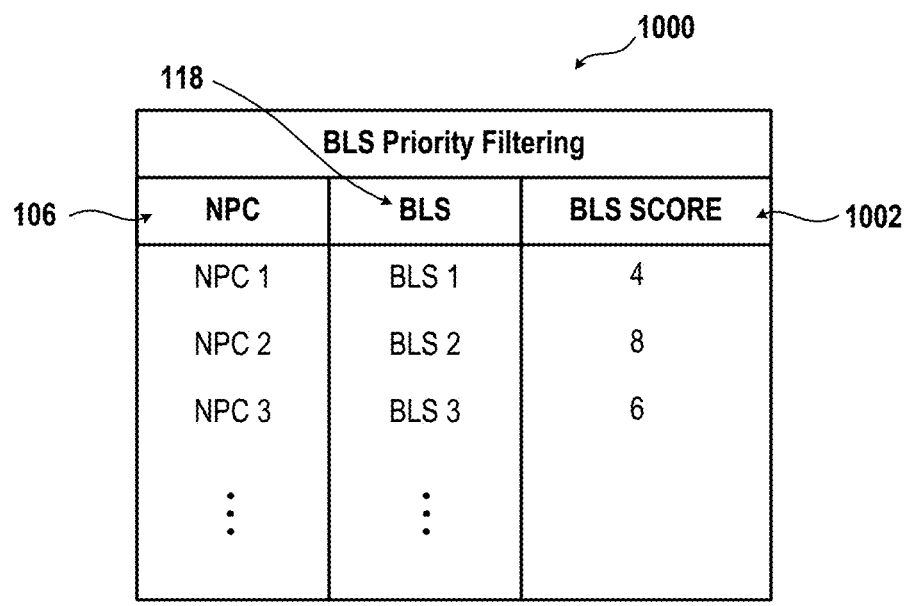
FIG. 10A illustrates an example of BLS priority filtering for multiple NPC, in accordance with an implementation of the disclosure.

FIG. 10A illustrates an example of BLS priority filtering for multiple NPCs. As noted above, the scene 102 may include multiple NPCs 106 that can interact with the player 802. To determine which NPC 106 has priority to interact with the player 802, an embodiment may include a BLS priority filtering 1000 operation that can determine a BLS score 1002 for each NPC 106. For example, as shown FIG. 10a, in one embodiment, the table may include a listing of the NPCs 106, the associated BLS 118, and the BLS score 1002 for the corresponding NPC 106. In the example noted above with reference to FIG. 9, the BLS priority filtering 1000 operation may determine that the second NPC 106b has the highest BLS score (e.g., BLS score=8) because of its proximity to the player 802 and because of a villain character 904 appears within its POV 902b.

Similarly, the BLS priority filtering 1000 operation may determine that the third NPC 106c may have the second highest BLS score (e.g., BLS score=6) because of a villain character 904 appears within its POV 902c. It follows that the first NPC 106c may have the lowest BLS score (e.g., BLS score=4) because the villain character 904 is not within its POV 902a. In one embodiment, the system may only process the BLS for the second NPC 106b, since it has the highest priority and can eliminate or reduce system processing of BLS of the other NPCs that are not as relevant to the player.

Figure 10B:
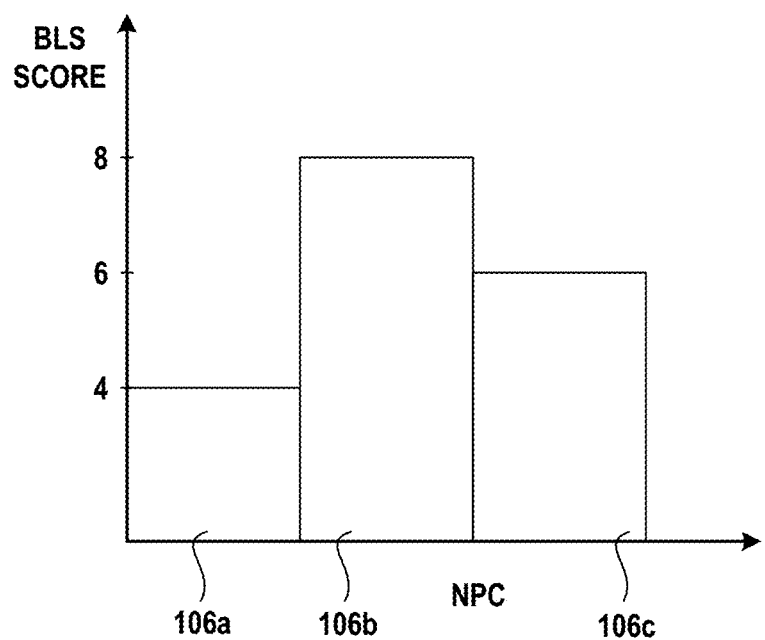
FIG. 10B illustrates an example of a BLS score graph for a scene that includes multiple NPCs, in accordance with an implementation of the disclosure.

FIG. 10B illustrates an example of a BLS score graph for a given scene that includes multiple NPCs. In accordance with one embodiment, the BLS score 1002 can be plotted for each NPC 106. The plot can help provide a visual representation to determine the respective scores for each NPC. As illustrated in FIG. 10B, the graph shows the BLS score 1002 plotted along the y-axis and the corresponding NPC 106 plotted along the x-axis. This plot shows that, in one embodiment, processing the BLS of the second NPC 106b is more important. In this embodiment, it may also be possible to perform reduced processing of BLS for NPC 106c, and even more reduced processing for NPC 106a. In one embodiment, reduced processing of BLS may include only adjusting parts of the NPC. For instance, instead of adjusting the animation of all of the NPC's parts, only the face may be adjusted for animation or only the arms, or only the feet/legs.

Figure 11:
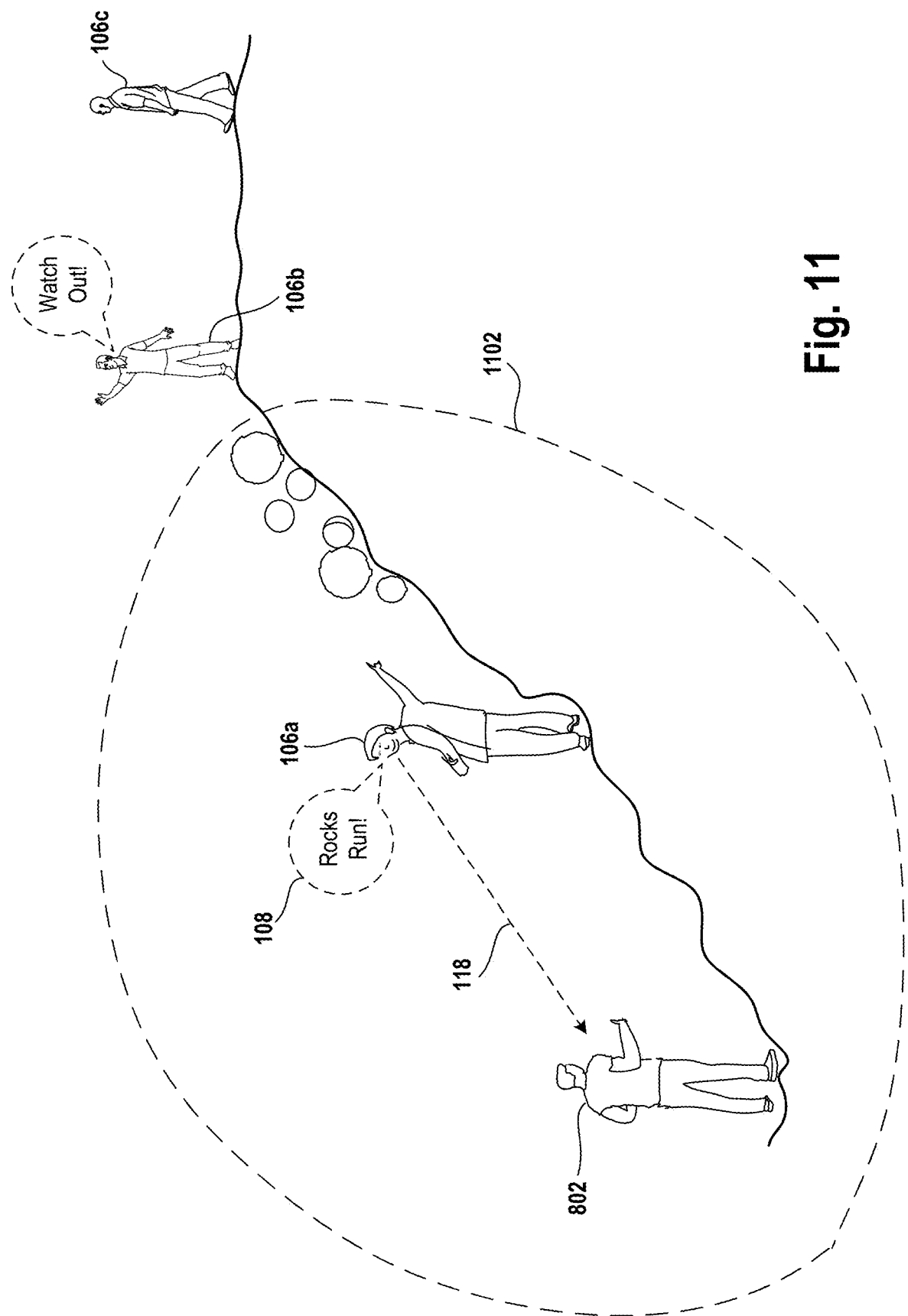
FIG. 11 illustrates an embodiment of a scene that includes a player and multiple NPCs, in accordance with an implementation of the disclosure.

FIG. 11 illustrates an embodiment of a scene 102 that includes a player 802 and multiple NPCs 106. As shown in the illustration, the scene 102 includes a first NPC 106a, second NPC 106b, third NPC 106c, and a player 802 hiking up a mountain. Within the scene 102, a zone of influence 1102 encompasses the player 802, first NPC 106a, and a portion of the scene. The first NPC 106a is shown yelling in the direction of the player 802, "Rocks! Run!" (i.e., voice output 108). The BLS 118 that is used to animate first NPC 106a for the player 802 includes the first NPC 106a looking in the direction of the player 802 and pointing in the direction of the rocks that are tumbling down the trail. In addition, the first NPC 106a may have a facial expression that indicates fear (i.e., eyebrows pulled up and together, mouth stretched, eyes wide open).

Furthermore, the first NPC 106a may have its arm raised and pointing in the direction of the tumbling rocks. The combination of these body reactions along with the voice output 108 are presented as the output adjusted animation of the NPC, based on the processed BLS 118. From the perspective of the player 802, the body language of the NPC may warn the player to run down the hill to seek safety. In accordance with another embodiment, the player 802 may also receive adjusted body language of the second NPC 106b who warns the player 802 to "watch out."

In some embodiments, the processing of animating an NPC may be implemented as an add-on code to an existing game engine. By way of example, a game programmer may apply NPC animation processing to animate certain NPCs, while not adjusting others. The NPCs that may be animated may be those that are more prominent in the game scenes or those NPCs that will interact closest with player control characters. Thus, NPCs that are not closest to player characters may be filtered out of additional animation. Those NPCs that do interact more or are viewable to the player character may be animated more. In one example, add-on code enables existing games with robot-like animated NPCs to add emotion and context based animation to some or all of its NPCs. In another example, the NPC emotion and context based animation can be coded directly into the game. In another example, the NPC emotion and context based animation can be coded into a game engine.

Figure 12:
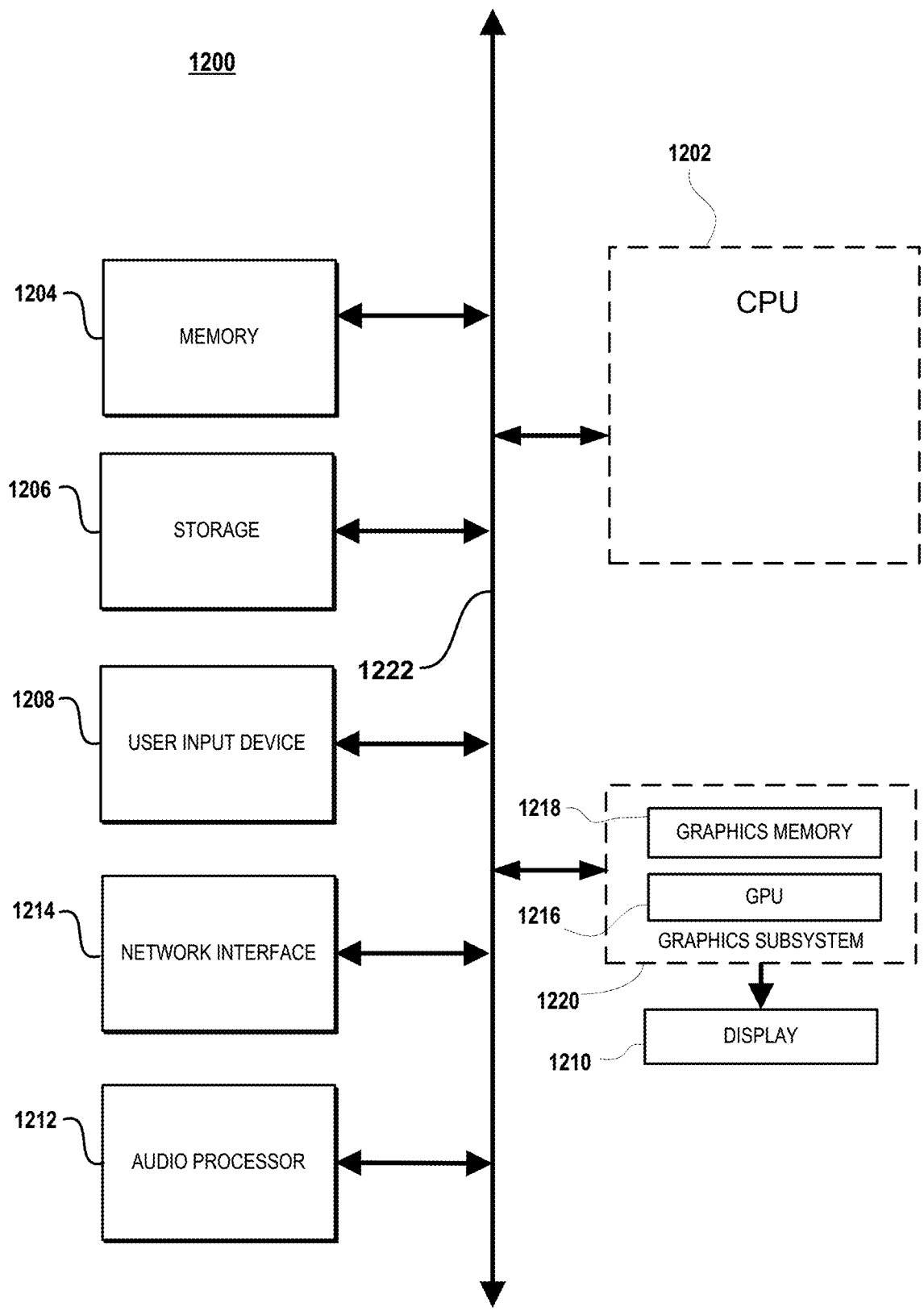
FIG. 12 illustrates components of an example device that can be used to perform aspects of the various embodiments of the present disclosure.

FIG. 12 illustrates components of an example device 1200 that can be used to perform aspects of the various embodiments of the present disclosure. For example, FIG. 12 illustrates an exemplary hardware system suitable for implementing a device that provides services in support of a user, such as for surfacing contextually relevant in-game resources for use by a player in response to a query or for surfacing contextually in-store resources for use by a player, in accordance with one embodiment. This block diagram illustrates a device 1200 that can incorporate or can be a personal computer, video game console, personal digital assistant, a server or other digital device, suitable for practicing an embodiment of the disclosure. Device 1200 includes a central processing unit (CPU) 1202 for running software applications and optionally an operating system. CPU 1202 may be comprised of one or more homogeneous or heterogeneous processing cores. For example, CPU 1202 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 1200 may be a localized to a player playing a game segment (e.g., game console), or remote from the player (e.g., back-end server processor).

Memory 1204 stores applications and data for use by the CPU 1202. Storage 1206 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1208 communicate user inputs from one or more users to device 1200, examples of which may include keyboards, mice, joysticks, touch pads, touch screens, still or video recorders/cameras, tracking devices for recognizing gestures, and/or microphones. Network interface 1214 allows device 1200 to communicate with other computer systems via an electronic communications network, and may include wired or wireless communication over local area networks and wide area networks such as the internet. An audio processor 1212 is adapted to generate analog or digital audio output from instructions and/or data provided by the CPU 1202, memory 1204, and/or storage 1206. The components of device 1200, including CPU 1202, memory 1204, data storage 1206, user input devices 1208, network interface 1210, and audio processor 1212 are connected via one or more data buses 1222.

A graphics subsystem 1220 is further connected with data bus 1222 and the components of the device 1200. The graphics subsystem 1220 includes a graphics processing unit (GPU) 1216 and graphics memory 1218. Graphics memory 1218 includes a display memory (e.g., a frame buffer) used for storing pixel data for each pixel of an output image. Graphics memory 1218 can be integrated in the same device as GPU 1208, connected as a separate device with GPU 1216, and/or implemented within memory 1204. Pixel data can be provided to graphics memory 1218 directly from the CPU 1202. Alternatively, CPU 1202 provides the GPU 1216 with data and/or instructions defining the desired output images, from which the GPU 1216 generates the pixel data of one or more output images. The data and/or instructions defining the desired output images can be stored in memory 1204 and/or graphics memory 1218. In an embodiment, the GPU 1216 includes 3D rendering capabilities for generating pixel data for output images from instructions and data defining the geometry, lighting, shading, texturing, motion, and/or camera parameters for a scene. The GPU 1216 can further include one or more programmable execution units capable of executing shader programs.

The graphics subsystem 1214 periodically outputs pixel data for an image from graphics memory 1218 to be displayed on display device 1210. Display device 1210 can be any device capable of displaying visual information in response to a signal from the device 1200, including CRT, LCD, plasma, and OLED displays. Device 1200 can provide the display device 1210 with an analog or digital signal, for example.

While specific embodiments have been provided to demonstrate the surfacing of contextually-relevant resources to players, these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for generating animation for a game, comprising:

examining a scene of the game for a non-player character (NPC) that is providing voice output;

examining the voice output of the NPC to identify intensity modulation of the voice output, said intensity modulation identifies a sound intensity level associated with the voice output of the NPC based on context of the scene when the NPC provides the voice output; and processing the intensity modulation of the voice output of the NPC to predict body language signals (BLS) for the NPC, the body language signals used to cause features of the NPC to react consistent with an emotion content of the intensity modulation identified in the voice output.

2. The method of claim 1, wherein the prediction of BLS for the NPC additionally processes context data related to the scene in which the NPC is present and physical characteristics of the NPC, such that said context data and said physical characteristics of the NPC are analyzed along with the intensity modulation of the voice output.

3. The method of claim 2, wherein the prediction of the BLS includes processing feature data from the intensity modulation, the context data and the physical characteristics of the NPC, the processing of the feature data includes classifying the feature data through a machine learning model to produce character adjustment metrics that output an adjusted animation profile.

4. The method of claim 3, wherein the features of the NPC include body parts of the NPC and facial features of the NPC.

5. The method of claim 3, wherein the adjusted animation profile is used by an animation engine to animate the NPC in the scene.

6. The method of claim 3, wherein the character adjustment metrics are applied to a standard reaction profile of the NPC, the character adjustment metrics apply a weighting factor to one or more features of the standard reaction profile of the NPC.

7. The method of claim 3, wherein the weighting factor is configured to increase or decrease a magnitude of one or more features of the standard reaction profile.

8. The method of claim 1, wherein the emotion content of the intensity modulation identified in the voice output is associated with a composite animation.

9. The method of claim 1, wherein the prediction of BLS for the NPC additionally processes context data related to the scene in which the NPC is present and physical characteristics of the NPC to produce character adjustment metrics that output an adjusted animation profile used by an animation engine to animate the NPC in the scene.

10. The method of claim 9, wherein the animation engine is configured to receive player location awareness (PLA) data and context awareness gesturing (CAG) data, the PLA and CAG is configured to provide for additional animation of the NPC.

11. The method of claim 10, wherein the additional animation of the NPC using the PLA data enables processing of the NPC animation so that the NPC appears to look toward a game player controlled by a user of the game.

12. The method of claim 10, wherein the additional animation of the NPC using the CAG data enables processing of the NPC animation so that the NPC appears to provide context gesturing in the game.

13. A system for generating animation for a game, comprising:

a processor for executing the game, the game having a scene for a non-player character (NPC) that is providing voice output, the processor is configured to examine the voice output of the NPC to identify intensity modulation of the voice output, said intensity modulation identifies a sound intensity level associated with the voice output of the NPC based on context of the scene when the NPC provides the voice output, the processor is further configured to process the intensity modulation of the voice output of the NPC to predict body language signals (BLS) for the NPC, wherein the body language signals are used to cause features of the NPC to react consistent with an emotion content of the intensity modulation identified in the voice output;

wherein the reaction of the NPC is displayed on a screen rendering the game, the reaction includes adjustments to the features of the NPC to substantially align with content of the voice output.

14. The system of claim 13, wherein the processor is configured to additionally processes context data related to the scene in which the NPC is present and physical characteristics of the NPC to produce character adjustment metrics that output an adjusted animation profile used by an animation engine to animate the NPC in the scene, such that the features of the NPC substantially align with content of the voice output.

15. The system of claim 14, wherein the character adjustment metrics are applied to a standard reaction profile of the NPC, the character adjustment metrics apply a weighting factor to one or more features of the standard reaction profile of the NPC.

16. The system of claim 14, wherein the animation engine is configured to receive player location awareness (PLA) data and context awareness gesturing (CAG) data, the PLA and CAG is configured to provide for additional animation of the NPC.

17. The system of claim 16, wherein the additional animation of the NPC using the PLA data enables processing of the NPC animation so that the NPC appears to look toward a game player controlled by a user of the game.

18. The system of claim 16, wherein the additional animation of the NPC using the CAG data enables processing of the NPC animation so that the NPC appears to provide context gesturing in the game.

19. The system of claim 13, wherein the prediction of the BLS includes causing the processor to process feature data from the intensity modulation, context data in the scene and physical characteristics of the NPC, the processing of the feature data includes classifying the feature data through a machine learning model to produce character adjustment metrics that output an adjusted animation profile used by an animation engine to animate the NPC in the scene.

20. The system of claim 19, wherein the features of the NPC include body parts of the NPC and facial features of the NPC.

* * * * *